United States Patent [19]
Buckingham

[11] Patent Number: 6,018,493
[45] Date of Patent: Jan. 25, 2000

[54] SONAR SUSPENSION APPARATUS

[75] Inventor: David E. J. Buckingham, Pinner, United Kingdom

[73] Assignee: Dowty Maritime Systems Limited, Middlesex, United Kingdom

[21] Appl. No.: 07/118,158

[22] Filed: Oct. 1, 1987

[30] Foreign Application Priority Data

Oct. 15, 1986 [GB] United Kingdom .................... 8624666

[51] Int. Cl.[7] ..................................................... G01V 1/38
[52] U.S. Cl. .............................. 367/16; 367/20; 367/153; 367/155; 367/165; 441/33
[58] Field of Search ................................. 181/112; 367/1, 367/5, 6, 20, 106, 125, 126, 130, 141, 153, 154, 157, 159, 161, 164, 165, 173, 188; 441/10, 33

[56] References Cited

U.S. PATENT DOCUMENTS

| | | | |
|---|---|---|---|
| 3,290,642 | 12/1966 | Mason et al. | 441/33 X |
| 3,886,491 | 5/1975 | Jonkey et al. | 367/173 |
| 3,986,159 | 10/1976 | Horn | 441/33 X |
| 4,004,265 | 1/1977 | Woodruff et al. | 367/4 |
| 4,330,895 | 5/1982 | Putman et al. | 367/4 |

*Primary Examiner*—J. Woodrow Eldred
*Attorney, Agent, or Firm*—Pillsbury Madison & Sutro LLP

[57] ABSTRACT

Sonar suspension apparatus comprising a flotation buoy and an underwater sonar array connected to the flotation buoy by a suspension cable, wherein the sonar array comprises a plurality of transducer-carrying elongate members including at least one rigid arm and at least one flexible line.

4 Claims, 1 Drawing Sheet

U.S. Patent  Jan. 25, 2000  6,018,493
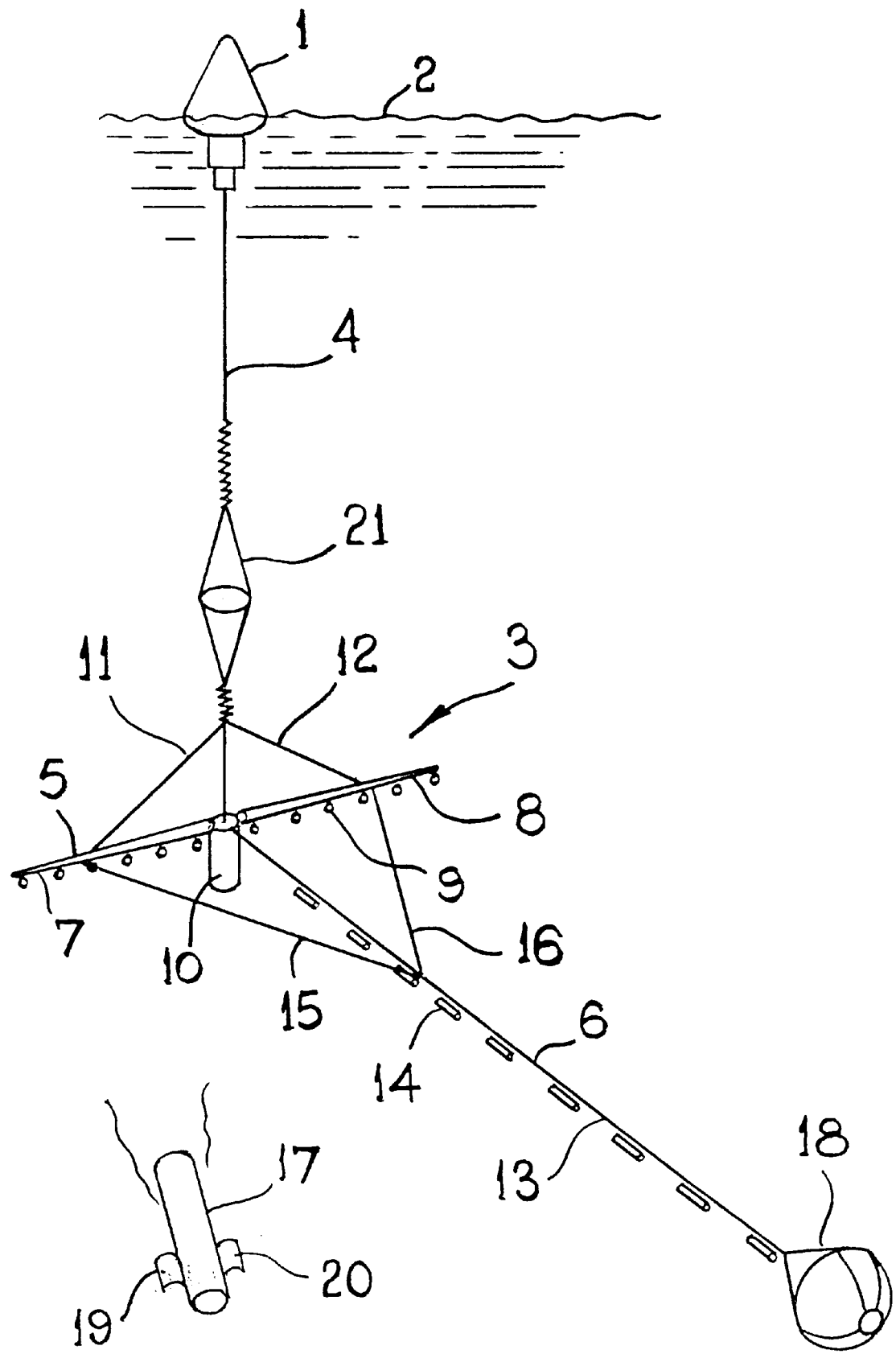

SONAR SUSPENSION APPARATUS

This invention relates to sonar suspension apparatus of the kind comprising a flotation buoy and an underwater sonar array connected to the flotation buoy by a suspension cable.

Large underwater sonar arrays must be deployed in order to locate a large number of hydrophone transducers at appropriate relative locations to enable detection over long range and with high sensitivity. Such arrays may comprise a number of separately deployed suspension elements each of which is provided with a separate flotation buoy. However, it is more convenient and economical for the array to be deployed as a unitary structure generally suspended from a single flotation buoy. To this end various unitary structures have been proposed incorporating retracted arms which are capable of being extended on deployment at an appropriate location in order to form a large array of rigid transducer-carrying members. However, such structures are necessarily complex and heavy, and prone to mechanical problems during deployment.

It is an object of the invention to provide a novel form of suspension apparatus which is particularly suitable in such an application.

According to the present invention there is provided sonar suspension apparatus comprising a flotation buoy and an underwater sonar array connected to the flotation buoy by a suspension cable, wherein the sonar array comprises a plurality of trasducer-carrying elongate members including at least one rigid arm and at least one flexible line.

The combination of at least one rigid transducer-carrying arm and at least one flexible transducer-carrying line in a unitary structure enables considerable simplification of design and ease of deployment. It also enables the apparatus to be made lighter in weight and to be produced more economically.

In a preferred form of the invention the sonar array comprises two rigid transducer-carrying arms, which are conveniently telescopic, and a flexible transducer-carrying line each of which is connected at one end to a common connection assembly. Preferably the arrangement is such that, when the apparatus is deployed, the two rigid arms extend in radially opposite directions in a substantially horizontal plane and the flexible line extends substantially perpendicularly to the two arms. Advantageously the flexible line is substantially neutrally buoyant.

A particular advantage of such apparatus is that it can be adapted to be deployed in either one of two possible arrangements.

In a first arrangement, the apparatus includes a drag member, such as a drogue, attached to the flexible line so that the flexible line is caused to extend in a substantially horizontal plane when deployed due to the tension exerted on the line by the effect of tidal flow on the drag member.

In a second arrangement, the apparatus includes a sinker weight attached to the flexible line so that the flexible line is caused to extend substantially vertically downwards when deployed due to the tension exerted on the line by the sinker weight.

Conveniently the apparatus includes an outer housing for accommodating the transducer-carrying members before they are deployed. The outer housing may be arranged to become detached from the remainder of the apparatus after deployment.

In order that the invention may be more fully understood, reference will now be made, by way of example, to the accompanying drawing in which the single figure shows preferred apparatus in accordance with the invention in its deployed state.

The illustrated apparatus comprises basically a flotation buoy 1, shown floating on the sea surface 2, and a sonar array 3 connected to the flotation buoy 1 by a suspension cable 4. The sonar array 3, which is a "tee" array, comprises a rigid part 5 and a flexible part 6.

The rigid part 5 of the array 3 consists of two telescopic rigid arms 7 and 8, each of which consists of a plurality of sections of circular composite material nesting one within the other prior to extension. Each section is provided with a known arrangement for locking into the next section on extension and is provided with at least one attachment point for a hydrophone transducer 9 and also for attachment of electrical signal cables (not shown). Each arm 7 or 8 is connected at one end to a lower housing unit 10 which incorporates electronic control circuitry, by means of a pivotal connection enabling the arm 7 or 8 to be folded down to its deployed position from a position parallel to the cable 4 on deployment.

In their deployed positions the two arms 7 and 8 are each about 5.5 metres long and extend in a substantially horizontal plane. Furthermore the arms 7 and 8 support twelve hydrophone transducers 9 at required spacings along their lengths, as well as the electrical signal cables connecting each of the transducers 9 to the circuitry within the lower housing unit 10. Stabiliser cords 11 and 12 extend between the suspension cable 4 and the arms 7 and 8.

The flexible part 6 of the array 3 comprises a flexible line 13 attached to the lower housing unit 10 adjacent to the pivotal connections of the rigid arms 7 and 8. The flexible line 13 is made from neutrally buoyant electrical cabling which serves the dual function of supporting ten hydrophone transducers 14 at required spacings along its length and of providing electrical interconnections between the transducers 14 and the circuitry within the lower housing unit 10. More particularly interconnection wiring (not shown) extends between each transducer 14 and the cable and is attached electrically thereto, the joint being sealed after attachment by a suitable encapsulating material. When deployed the flexible line 13 is about 100 metres long and extends substantially perpendicularly to the a,ms 7 and 8. Tensioning stays 15 and 16 are connected between the arms 7 and 8 and the flexible line 13.

Each hydrophone transducer 9 or 14 is of a bender diaphragm type encapsulated within a cylindrical semi-flexible case. The case also contains miniaturized electronic circuitry required for amplification and multiplexing of the signals from the bender hydrophone.

The complete assembly is arranged to be as near to neutral buoyancy as possible with low cost manufacturing techniques.

The manner in which the apparatus is deployed in the sea from a vessel or aircraft will now be described. In this respect the apparatus can be deployed in either one of two possible arrangements, and these two possible arrangements will be separately described.

The complete apparatus is initially accommodated within an outer housing 17 with the lower housing unit 10 within a lower part of the housing 17, the arms 7 and 8 fully retracted and folded parallel to one another and to the axis of the unit 10, the flexible line 13 coiled up within the housing 17, and the float 1 attached to the top of the housing 17. On initial striking of the water surface the float 1 is detached from the housing 17 and floats on the sea surface 2. The remainder of the assembly sinks beneath the surface, and the cable 4 is paid out until a sensor indicates that the assembly has reached a pre-determined depth. Meanwhile the arms 7 and 8 are extended to their complete lengths while still remaining parallel to one another. At the required depth the arms 7 and 8 are pivoted outwardly to their deployed positions, a mechanism being provided to ensure that both arms 7 and 8 deploy symmetrically. Such deployment is accompanied by separation of the outer housing 17 from the arms 7 and 8 and the unit 10 and is assisted by paying out of the cable 4. A spring bias is provided to overcome any stiction and to give the arms 7 and 8 an initial kick outwards.

While the outer housing 17 becomes separated from the arms 7 and 8 and the unit 10 at this stage, it remains attached to the flexible line 13 which is then paid out from the housing 17. In a first arrangement a flexible fabric or plastics drogue 18 or underwater parachute is attached to the end of the flexible line 15 and is paid out with the flexible line 13 from the housing 17. Advantageously the housing 17 is provided with semi-circular-section spring loaded panels 19 and 20 which are sprung outwardly during deployment and which are set at a small angle so as to act as wings to control the descent of the housing 17 through the water during deployment.

After paying out of the drogue 18, the housing 17 is jettisoned and sinks to the bottom of the sea. In this arrangement the flexible line 13 is caused to extend in a substantially horizontal plane and is maintained in tension by the effect of tidal flow on the drogue 18. It will be appreciated, therefore, that the orientation of the flexible line 13 will be determined by the direction of tidal flow at the deployed depth. The deployed array can be maintained at the required depth by virtue of the fact that it exhibits as near to neutral buoyancy as possible, extra drag members in the form of kites, such as the kite 21 shown in the figure, being inserted in the suspension cable 4 in order to create a balance of drag forces between the surface and sub-surface assemblies so that a desired tension exists in the horizontal array to keep it straight. A fluxgate compass is incorporated in the lower housing unit 10 in order to provide data on the direction in which the array is oriented.

In a second deployment arrangement, the manner of deployment is changed by a simple mechanism so as to cause the flexible line to extend vertically downwards from the unit 10, such an arrangement being beneficial to the overall performance of the system for certain acoustic environments. This is arranged by jettisoning the drogue 18 with the housing 17 after deployment of the arms 7 and 8, but leaving in place a sinker weight (not shown) attached to the end of the line 15 which serves to keep the line 13 vertical in the tidal flow.

As is conventional, the flotation buoy 1 includes a transmitter and associated circuitry electrically connected to the circuitry of the lower housing unit 10 by way of the cable 4.

I claim:

1. Sonar suspension apparatus comprising:
   a flotation buoy;
   a suspension cable having first and second ends, the first end being connected to the flotation buoy; and
   an underwater sonar array connected to the second end of the suspension cable, the sonar array including:
      a common connection assembly,
      first and second rigid arms each arm being connected to the common connection assembly,
      a flexible line connected to the common connection assembly, and
      a plurality of hydrophone transducers carried on at least one of the first and second arms and on the flexible line, wherein the first and second rigid arms extend in radially opposite directions in a substantially horizontal plane and the flexible line extends substantially perpendicularly to the two arms.

2. Apparatus according to claim 1 in which the flexible line is substantially neutrally buoyant.

3. Apparatus according to claim 1 further comprising a drag member attached to the flexible line.

4. Apparatus according to claim 1 further comprising an outer housing for accommodating the transducer-carrying members before the members are deployed.

* * * * *